United States Patent
Harvey (10) Patent No.: US 11,553,618 B2
(45) Date of Patent: Jan. 10, 2023

(54) METHODS AND SYSTEMS OF BUILDING AUTOMATION STATE LOAD AND USER PREFERENCE VIA NETWORK SYSTEMS ACTIVITY

(71) Applicant: Troy Aaron Harvey, Brighton, UT (US)

(72) Inventor: Troy Aaron Harvey, Brighton, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 0 days.

(21) Appl. No.: 17/021,965

(22) Filed: Sep. 15, 2020

(65) Prior Publication Data

US 2022/0066405 A1 Mar. 3, 2022

Related U.S. Application Data

(60) Provisional application No. 63/070,460, filed on Aug. 26, 2020.

(51) Int. Cl.
*G05B 15/02* (2006.01)
*H04W 4/80* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC ..... F24F 11/63; G05B 15/02; G05B 23/0216; H04W 4/80; H05K 7/1481; G06F 30/392; H02J 2310/12
See application file for complete search history.

(56) References Cited

U.S. PATENT DOCUMENTS

| 5,530,643 A | 6/1996 | Hodorowski |
| 6,275,962 B1 | 8/2001 | Fuller et al. |

(Continued)

FOREIGN PATENT DOCUMENTS

| CN | 103926912 A | 7/2014 |
| CN | 206002869 U | 3/2017 |

(Continued)

OTHER PUBLICATIONS

De Meester et al., SERIF:A Semantic ExeRcise Interchange FormatConference: Proceedings of the 1st International Workshop on LINKed EDucation, Oct. 2015.

(Continued)

*Primary Examiner* — Ramesh B Patel
(74) *Attorney, Agent, or Firm* — Genie Lyons (57) ABSTRACT

Tools and techniques are described to modify a defined space state depending on number of users in the space and/or preferences of users in the space. In some embodiments, users entering or leaving a space are noticed by network systems. A controller then modifies resources in the space to account for the greater or lesser load. In other cases, the network system notices that a specific user has entered a building. This user may have preferences stored in the system which the building control system then responds to by changing state of a device that controls physical state within the space.

19 Claims, 6 Drawing Sheets

(51) Int. Cl.

| | | |
|---|---|---|
| *F24F 11/63* | (2018.01) | |
| *H05K 7/14* | (2006.01) | |
| *G06F 8/51* | (2018.01) | |
| *G06F 3/041* | (2006.01) | |
| *G05B 19/048* | (2006.01) | |
| *H04M 3/30* | (2006.01) | |
| *G06F 3/04847* | (2022.01) | |
| *G06F 3/147* | (2006.01) | |
| *G05B 23/02* | (2006.01) | |
| *H02J 3/00* | (2006.01) | |
| *G06F 30/13* | (2020.01) | |
| *G06F 30/12* | (2020.01) | |
| *G06F 3/0482* | (2013.01) | |
| *H04L 67/125* | (2022.01) | |
| *G06F 30/18* | (2020.01) | |
| *G06F 8/41* | (2018.01) | |
| *G06F 8/53* | (2018.01) | |
| *G06F 8/74* | (2018.01) | |
| *F24F 11/32* | (2018.01) | |
| *F24F 11/88* | (2018.01) | |
| *F24F 11/49* | (2018.01) | |
| *G05B 13/02* | (2006.01) | |
| *H04L 67/12* | (2022.01) | |
| *G06F 1/3209* | (2019.01) | |
| *G06F 1/3246* | (2019.01) | |
| *G06F 9/4401* | (2018.01) | |
| *H04W 84/00* | (2009.01) | |
| *G06Q 30/02* | (2012.01) | |
| *H04B 3/46* | (2015.01) | |
| *H04L 43/50* | (2022.01) | |
| *H04L 67/75* | (2022.01) | |
| *G01R 31/55* | (2020.01) | |
| *G06F 30/392* | (2020.01) | |
| *G06F 113/04* | (2020.01) | |
| *G06F 115/12* | (2020.01) | |
| *G06F 111/04* | (2020.01) | |
| *G06F 111/16* | (2020.01) | |
| *G06F 113/16* | (2020.01) | |

(52) U.S. Cl.
CPC .............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/0482* (2013.01); *G06F 3/04186* (2019.05); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(56) References Cited

U.S. PATENT DOCUMENTS

| | | | |
|---|---|---|---|
| 6,301,341 | B1 | 10/2001 | Gizara et al. |
| 6,645,066 | B2 | 11/2003 | Gutta et al. |
| 7,304,855 | B1 | 12/2007 | Milligan et al. |
| 7,578,135 | B2 | 8/2009 | Mattheis |
| 7,587,250 | B2 | 9/2009 | Coogan et al. |
| 7,729,882 | B2 | 6/2010 | Seem |
| 7,734,572 | B2 | 6/2010 | Wiemeyer et al. |
| 7,917,232 | B2 | 3/2011 | McCoy et al. |
| 8,024,054 | B2 | 9/2011 | Mairs et al. |
| 8,099,178 | B2 | 1/2012 | Mairs et al. |
| 8,503,943 | B2 | 8/2013 | Spanhake |
| 8,628,239 | B2 | 1/2014 | Merrow et al. |
| 8,643,476 | B2 | 2/2014 | Pinn et al. |
| 8,749,959 | B2 | 6/2014 | Riley et al. |
| 8,782,619 | B2 | 7/2014 | Wu et al. |
| 8,925,358 | B2 | 1/2015 | Kasper |
| 9,441,847 | B2 | 9/2016 | Grohman |
| 9,521,724 | B1 | 12/2016 | Berry et al. |
| 9,602,301 | B2 | 3/2017 | Averitt |
| 9,664,400 | B2 | 5/2017 | Wroblewski et al. |
| 9,678,494 | B2 * | 6/2017 | Hyde .................. H05B 47/155 |
| 9,740,385 | B2 | 8/2017 | Fadell et al. |
| 9,791,872 | B2 | 10/2017 | Wang et al. |
| 9,857,238 | B2 | 1/2018 | Malhotra et al. |
| 9,860,961 | B2 | 1/2018 | Chemel et al. |
| 9,952,573 | B2 | 4/2018 | Sloo et al. |
| 10,042,730 | B2 | 8/2018 | Zebian |
| 10,094,586 | B2 | 10/2018 | Pavlovski et al. |
| 10,223,721 | B1 | 3/2019 | Bhatia |
| 10,528,016 | B2 | 1/2020 | Noboa |
| 10,557,889 | B2 | 2/2020 | Montoya et al. |
| 10,558,183 | B2 | 2/2020 | Piaskowski et al. |
| 10,558,248 | B2 | 2/2020 | Adrian |
| 10,627,124 | B2 | 4/2020 | Walser et al. |
| 10,640,211 | B2 | 5/2020 | Whitten et al. |
| 10,672,293 | B2 | 6/2020 | Labutov et al. |
| 10,687,435 | B2 | 6/2020 | Adrian et al. |
| 10,736,228 | B2 | 8/2020 | Kho et al. |
| 10,892,946 | B2 | 1/2021 | Costa et al. |
| 10,900,489 | B2 | 1/2021 | Rendusara et al. |
| 10,942,871 | B2 | 3/2021 | Cawse et al. |
| 10,943,444 | B2 | 3/2021 | Boyd et al. |
| 10,966,068 | B2 | 3/2021 | Tramiel et al. |
| 10,966,342 | B2 | 3/2021 | Lairsey et al. |
| 10,969,133 | B2 | 4/2021 | Harvey |
| 11,088,989 | B2 | 8/2021 | Gao et al. |
| 2004/0236547 | A1 | 11/2004 | Rappaport et al. |
| 2007/0096902 | A1 | 5/2007 | Seeley et al. |
| 2007/0162288 | A1 | 7/2007 | Springhart et al. |
| 2009/0065596 | A1 * | 3/2009 | Seem .................. F24F 11/30 236/51 |
| 2010/0131933 | A1 | 5/2010 | Kim et al. |
| 2011/0087988 | A1 | 4/2011 | Ray et al. |
| 2011/0125930 | A1 | 5/2011 | Tantos et al. |
| 2012/0102472 | A1 | 4/2012 | Wu et al. |
| 2012/0221986 | A1 | 8/2012 | Whitford et al. |
| 2014/0088772 | A1 | 3/2014 | Lelkens |
| 2014/0101082 | A1 | 4/2014 | Matsuoka et al. |
| 2014/0215446 | A1 | 7/2014 | Araya et al. |
| 2014/0358291 | A1 | 12/2014 | Wells |
| 2014/0364985 | A1 | 12/2014 | Tiwari et al. |
| 2015/0081928 | A1 | 3/2015 | Wintzell et al. |
| 2015/0198938 | A1 | 7/2015 | Steele et al. |
| 2015/0234381 | A1 | 8/2015 | Ratilla et al. |
| 2016/0016454 | A1 | 1/2016 | Yang et al. |
| 2016/0062753 | A1 | 3/2016 | Champagne |
| 2016/0073521 | A1 | 3/2016 | Marcade et al. |
| 2016/0086242 | A1 | 3/2016 | Schafer et al. |
| 2016/0088438 | A1 | 3/2016 | O'Keeffe |
| 2016/0092427 | A1 | 3/2016 | Bittmann |
| 2016/0132308 | A1 | 5/2016 | Muldoon |
| 2016/0195856 | A1 | 7/2016 | Spero |
| 2016/0205784 | A1 | 7/2016 | Kyle et al. |
| 2016/0209868 | A1 | 7/2016 | Hartman et al. |
| 2016/0295663 | A1 * | 10/2016 | Hyde .................. H05B 47/11 |

(56) References Cited

U.S. PATENT DOCUMENTS

| | | | |
|---|---|---|---|
| 2017/0097259 A1* | 4/2017 | Brown | G01J 1/0403 |
| 2017/0131611 A1* | 5/2017 | Brown | H04L 67/125 |
| 2017/0176034 A1 | 6/2017 | Hussain et al. | |
| 2017/0365908 A1* | 12/2017 | Hughes | G02F 1/163 |
| 2018/0005195 A1* | 1/2018 | Jacobson | G06Q 10/1095 |
| 2018/0075168 A1 | 3/2018 | Tiwari et al. | |
| 2018/0089172 A1 | 3/2018 | Needham | |
| 2018/0123272 A1 | 5/2018 | Mundt et al. | |
| 2018/0307781 A1 | 10/2018 | Byers et al. | |
| 2019/0087076 A1 | 3/2019 | Dey et al. | |
| 2019/0138704 A1* | 5/2019 | Shrivastava | E06B 9/24 |
| 2019/0156443 A1 | 5/2019 | Hall | |
| 2019/0173109 A1 | 6/2019 | Wang | |
| 2019/0294018 A1 | 9/2019 | Shrivastava et al. | |
| 2020/0003444 A1 | 1/2020 | Yuan et al. | |
| 2020/0018506 A1* | 1/2020 | Ruiz | F24F 11/46 |
| 2020/0050161 A1 | 2/2020 | Noboa | |
| 2020/0187147 A1 | 6/2020 | Meerbeek et al. | |
| 2020/0221269 A1 | 7/2020 | Tramiel et al. | |
| 2020/0226223 A1 | 7/2020 | Reichl | |
| 2020/0228759 A1* | 7/2020 | Ryan | G06V 10/143 |
| 2020/0255142 A1 | 8/2020 | Whitten et al. | |
| 2020/0279482 A1 | 9/2020 | Berry et al. | |
| 2020/0342526 A1 | 10/2020 | Ablanczy | |
| 2020/0379730 A1* | 12/2020 | Graham | H04M 1/72457 |
| 2020/0387041 A1 | 12/2020 | Shrivastava et al. | |
| 2020/0387129 A1 | 12/2020 | Chandaria | |
| 2021/0073441 A1 | 3/2021 | Austern et al. | |
| 2021/0081504 A1 | 3/2021 | Mccormick et al. | |
| 2021/0081880 A1 | 3/2021 | Bivins et al. | |

FOREIGN PATENT DOCUMENTS

| | | |
|---|---|---|
| CN | 206489622 U | 9/2017 |
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Kalagnanam et al., "A System for Automated Mapping of Bill-of-Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi:10.3390, Mar. 12, 2018.

Siano, P, "Demand response and smart grids—A survey", Renewable and Sustainable Energy Reviews 30 (2014) 461-478.

Wang et al., "A Practical Multi-Sensor Cooling Demand Estimation Approach Based on Visual Indoor and Outdoor Information Sensing," Sensors 2018, 18, 3591; doi:10.3390.

Yegulap, Serdar, "What is LLVM? The power behind Swift, Rust, Clang, and more," Infoworld, Mar. 11, 2020.

Amin, Massoud, "Toward self-healing energy infrastructure systems," IEEE Computer Applications in Power 14.1 (2002): pp. 20-28.

Gou, Wenqi, and Mengchu Zhou, "An emerging technology for improved building automation control, 2009, IEEE International Conference on Systems, Man and Cybernetics", IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

BigLadder Software, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft, C., et al., Assessment Method of Numerical Prediction Models for Combined Heat, Air and Moisture Transfer In Building Components: Benchmarks for One-Dimensional Cases, Journal of Thermal. Env. and Bldg. Sci., vol. 27, No. 4, Apr. 2004.

U.S. Appl. No. 15/995,019 Office Action dated Jul. 26, 2019.

U.S. Appl. No. 15/995,019 Office Action dated Oct. 8, 2020.

U.S. Appl. No. 15/995,019 Office Action dated Apr. 15, 2020.

* cited by examiner

METHODS AND SYSTEMS OF BUILDING AUTOMATION STATE LOAD AND USER PREFERENCE VIA NETWORK SYSTEMS ACTIVITY

RELATED APPLICATION

The present application hereby incorporates by reference the entirety of, and claims priority to, U.S. Provisional Patent Application Ser. No. 63/070,460 filed 26 Aug. 2020.

FIELD OF INVENTION

The present disclosure relates to sensors within a defined space, and more particularly to sensors that can associate personal devices with comfort preferences.

BACKGROUND

Different people and different objects may all have different requirements or preferences for what may be broadly termed "comfort." For example, an old, expensive violin may require humidity between 40-60% to keep it from degrading. A person may prefer a temperature of 74°. However, the temperature inside, the temperature outside, wind, and the humidity (among other factors) all interact to create a comfort level, which is not just the temperature as read by a thermometer. Further, someone dressed in a wool suit will prefer a different temperature than someone dressed in shorts and a t-shirt. Add to this, people are warm; when they enter a building, the building warms up due to their heat.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, one innovative embodiment comprises a defined space with a building control system that modifies upon user preference. It comprises computing hardware and programmable memory, a sensor that is operationally able to notice at least one signal from at least one personal electronic device, an associator which associates the personal electronic device with a user, a preference associated with the user stored in memory; and a modifier that modifies defined space state based on the preference.

Some embodiments provide a determiner determines the number of people in the defined space based on number of noticed signals from the sensor. The modifier will modify at least a portion of the defined space state based on the number of people in the defined space.

Some embodiments provide a comfort level calculator, which calculate number of people in the defined space, calculate a comfort value based on number of people in the defined space; and adjusts defined space state to match the comfort value. Matching the comfort value does not indicate that the defined space is able to exactly match the comfort value, but rather that the defined space is able to get within a certain percent of the comfort value, can get within a certain value of the comfort value, and so on.

Some embodiments provide an occupant profile which holds user preferences. These preferences may be location value, temperature value, humidity value, lighting value, security value, entertainment value, personal services value, comfort value, or grounds control value, height, weight, sex, activity level, or insulation value of clothing.

Some embodiments use personal electronic devices to determine the number of people within a space and then adaptively modify the state of the space to accommodate the number of people.

DETAILED DESCRIPTION

Disclosed below are representative embodiments of methods, computer-readable media, and systems having particular applicability to systems and methods for building neural networks that describe physical structures. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

Sensors are devices which are created to detect changes in the environment. These changes can then be used in a variety of ways, such as being displayed (as in a thermostat) or being sent to a computer system such as a controller, where the information will be used. Sensors can be used to infer occupancy using network systems activity. Network systems can associate information from particular electronic device's interaction with the network with a user. This user may have information about desired space comfort levels stored in a database that can be accessed by a controller that can change the state of the defined space. When the controller receives information that a specific user has entered the defined space, the controller may be able to use the database information to change state of the space or a portion of the space (e.g., an office) to meet the comfort goals of the user.

When multiple users are in a space, the controller may be able to use a formula to combine the comfort goals of the users present in the building to achieve a combined comfort goal. This combined comfort goal may be determined in a variety of ways. One such way may be to take the median or mean value of the comfort goals of the people that have been determined to be in the defined space. This comfort goal can be used by the controller to automatically adjust the defined space state to meet the needs of those in the space. A "state" as used herein may be Air Temperature, Radiant Temperature, Atmospheric Pressure, Sound Pressure, Occupancy Amount, Occupancy distance, Indoor Air Quality, CO2 concentration, Humidity, Light Intensity, or another state that can be measured and controlled.

The technical character of embodiments described herein will be apparent to one of ordinary skill in the art, and will also be apparent in several ways to a wide range of attentive readers. Some embodiments address technical activities that are rooted in computing technology, such as more efficiently running HVAC systems by the ability to preheat and precool buildings when people enter and exit, rather than waiting for sensors to register a greater amount of heat in a building. This is useful when a large number of people enter a building in short time, and can lead to energy savings and savings on equipment wear and tear as a heating system can slowly ramp up to its HVAC systems rather than suddenly trying to run at maximum capacity. Buildings can also run more efficiently as they can monitor people in the building including their locations, and only provide services for those portions of the building that are occupied. Buildings can also provide greater comfort to the inhabitants, as the building itself can cater its parameters to those in the building at a given time without lag, rather than waiting for state monitors, such as thermostats, to record the change. Other advantages based on the technical characteristics of the teachings will also be apparent to one of skill from the description provided.

Figure 1:
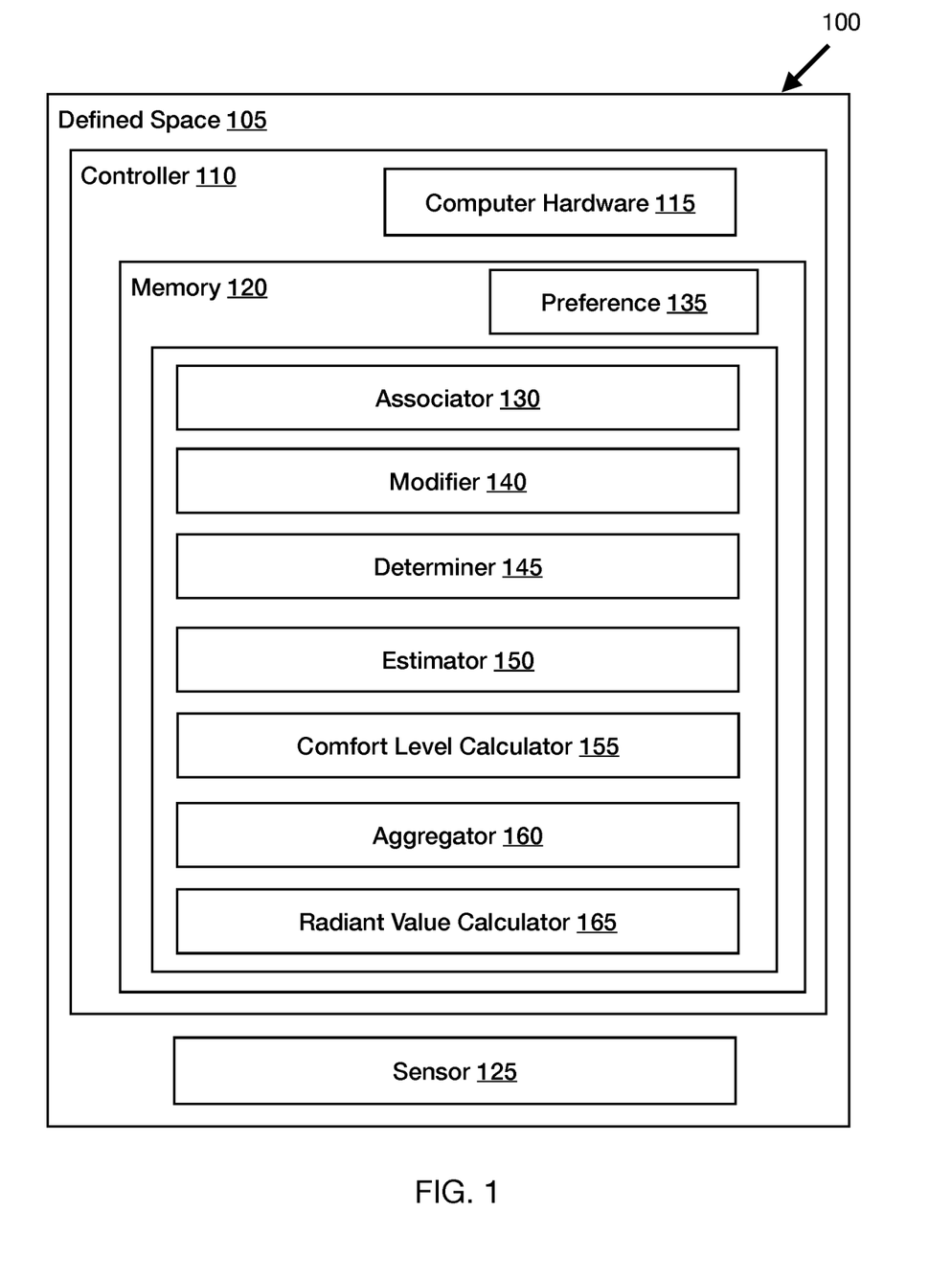
FIG. 1 is a functional block diagram showing an exemplary embodiment of a building control system in conjunction which described embodiments can be implemented.

II. Exemplary System for Modifying Comfort Level Through Personal Electronic Device Signals FIG. 1 shows 100 an embodiment of a system in which comfort level of a defined space may be modified based on factors determined by reference to personal electronic device signals. At 105 a defined space is shown. A "defined space" should be defined generously. It may refer to a single building, a collection of related buildings, buildings and space around them, an outside space such as a garden with irrigation, a portion of a building, such as a floor, a zone, a room, several rooms, etc. This defined space may have a building control system. The building control system may comprise a controller 110. The controller may comprise computer hardware 115 and memory 120, such that the controller can store and run computer programs. In some instances, the controller may also comprise a user input/output device, such as a computer monitor, a touch-screen, a thumb drive, a cd reader, and so on. The memory 120 may contain a user comfort preference 135. This preference may be used to determine a comfort model, or may be determined by a comfort model. The defines space also comprises at least one or more sensor(s) 125. The sensor(s) may help infer occupancy of the defined space, and infer other information to calculate a comfort level for occupants of the defined space 105. These sensors may be controlled by the controllers 110 which may be connected to the sensors using wired connections, wireless connections, or a combination of the two. These controllers may be able to control the sensors, read their sensor values, make decisions based on such sensor values, etc.

The sensor 125 may also be able to notice a signal from a personal electronic device. The personal electronic device may be a cell phone, a personal computer, a tablet, or any other sort of device that has a wireless signal. It may also be a tag with network capability attached to an object. The wireless signal may comprise strength and directionality. The wireless signal may also comprise an identifier that identifies the user to the system.

The defined space may also comprise an associator 130, which associates a personal device with a user. This may be done using e.g., IMEI & GPS call trackers, or other methods known to those of skill in the art. In some embodiments, there are multiple users with multiple preferences, and an aggregator 160 which calculates an aggregate state value (which also might be an aggregated comfort value). This aggregate state value comprises a calculation of the multiple user preferences, and may be some combination of temperature, humidity, noise level, such as air flow noise level, entertainment noise level, crowd noise level, CO2 levels, lighting level, allergen level, etc. In some embodiments, the modifier 140 uses the aggregate state value to modify output of a device operationally controlled by the controller to achieve the aggregate state value in the defined space. This associator 130 may be stored in memory 120 in the controller 110, may be a portion of a computer program associated with the controller, and so on.

Figure 2:
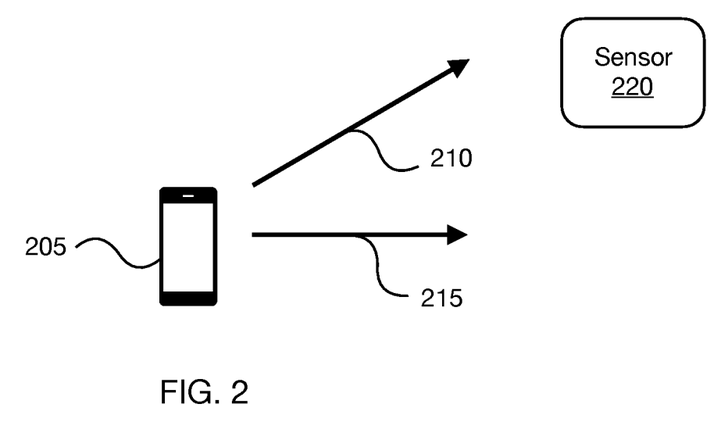
FIG. 2 is a functional block diagram showing an exemplary embodiment of a personal electronic device which described embodiments can be implemented.

With reference to FIG. 2, the sensor(s) 125, 220 may notice at least one wireless signal from at least one personal electronic device 205; the signal may comprise strength 210 and directionality 215. The signal may comprise a known wireless signal that the sensor 220 or the controller 110 may be able to associate with a specific person, people, or entity (such as a musical instrument, explosives, water pipes, or anything that may have preferred state values) that is associated with the personal electronic device 205. A specific wireless signal may be associated with a specific entity through it having previously connected to an existing network, through its bluetooth address, through its MAC address which it broadcasts occasionally, even when the wireless network is turned off on the phone, through being stored in a database associated with the controller 110, or through another method. The sensor 125, 220 may infer from the existence of the personal electronic device 205 that there is a person (or other object of interest) in the building. Sensor(s) 125, 220 may comprise beacons which broadcasts signals that can be read by personal communication devices. The beacons may be bluetooth beacons. The sensor may read signals broadcast from personal information devices, such as MAC addresses or bluetooth information. The sensor may then notice how many personal information devices are within a certain radius. The sensor may use the received signal strength indicator (RSSI) estimate. A controller 110 in the building may then determine a number of people in the building based on how many signals a sensor 125 (or sensors) has noticed. The controller may then use this information to modify state parameters in the defined space 105, such as heat needs, humidity, lighting, security, grounds control, or entertainment, to name a few possibilities.

When beacons are used to determine occupancy, the beacons may use trilateration to determine occupancy. Bluetooth beacons may have a Received Signal Strength Indicator (RSSI) value. This RSSI value is the signal strength of the beacon at a known distance. The personal electronic device (PED) carried by a person (or object) picks up the beacon and can determine its signal strength at the personal electronic device. The personal electronic device can then broadcast this information to the controller 110 using, e.g., a network. An approximation of the PED location can be determined using the known output signal strength of the beacon and the signal strength at the PED.

The sensor 125, 220 or the controller 110 may determine the location of one or more people in the building based on their personal electronic device wireless signal 210, 215. The controller then may use a modifier 140 to change state location in the defined space 105 based on the number of noticed people. The controller may use its ability to control an HVAC system to raise or lower the temperature, turn off a piece of equipment to lower noise in the space, change the humidity, etc.

In some embodiments, the sensor 125, the controller 110, or the two working in combination, may be able to determine that a specific signal is from a specific user that is known to the system. In such a case, the system (a database associated with the location, the sensors, the controller, or something else) may have access to preferences 135 for the user. This user may be an organization, a person, or an inanimate object with appropriate hardware. Using these preferences, the building may change state, i.e., the controller may stop, start, or modify resources to change state in the defined space. In an embodiment, there is an associator 130 which associates the personal electronic device with a known user; a preference storer 630 which stores at least one preference 135 associated with a known user; and a modifier 140 which modifies state (e.g., temperature, humidity, air flow noise level, lighting level, etc.) of at least one portion of the defined space, based on at least one preference of the user.

In some embodiments, the preference 135 comprises at least one of location, temperature, humidity, lighting, security, entertainment, personal services, or grounds control preferences of the user. For example, the user may be known to park in a certain parking space and walk into the building following a certain path. When the user's signal is picked up, lights along the user's preferred path may be signaled to turn on; any sprinklers along the user's preferred path may be signaled to turn off, and lights in the user's preferred office should turn on. In other instances, the signal itself is used to provide a location, and lights, sprinklers, etc., are modified depending on the location of the signal.

In some embodiments, preferences 135 are specific information about a user such as height, weight, sex, activity level, or insulation value of clothing. The system then may use an estimator 150 which uses at least one of the preferences associated with the known user to estimate at least one of user metabolic rate, user heat level, user convection level, or user sweat level, etc.

In some embodiments, there is also a radiant value calculator 165 that is used to calculate radiant temperature for a given person or people. This may be associated with the comfort level calculator 155. The comfort level calculator calculates (in some embodiments) a comfort level, which will be used by the modifier 140 to modify state of the defined space 105. This may be associated with the person or object identified by personal electronic device or may be calculated for a generalized person. Humans do not directly determine from a specific temperature how comfortable they are. Rather, perceived human comfort is a combination of air flow, humidity, and radiant temperature, which, roughly, is the mean temperature of a set of surfaces around a person.

According to Wikipedia[1],
https://en.wikipedia.org/wiki/Mean_radiant_temperature, last viewed May 12, 2020

"There are different ways to estimate the mean radiant temperature, either applying its definition and using equations to calculate it, or measuring it with particular thermometers or sensors.

"Since the amount of radiant heat lost or received by human body is the algebraic sum of all radiant fluxes exchanged by its exposed parts with the surrounding sources, MRT can be calculated from the measured temperature of surrounding walls and surfaces and their positions with respect to the person. Therefore, it is necessary to measure those temperatures and the angle factors between the person and the surrounding surfaces.[1] Most building materials have a high emittance ε, so all surfaces in the room can be assumed to be black. Because the sum of the angle factors is unity, the fourth power of MRT equals the mean value of the surrounding surface temperatures to the fourth power, weighted by the respective angle factors.

The following equation is used:

$$MRT^4 = T_1^4 F_{p-1} + T_2^4 F_{p-2} + \ldots + T_n^4 F_{p-n} \text{ where}$$

MRT is Mean Radiant Temperature:
$T_n$ is the temperature of surface "n" in Kelvins;
$F_{p-n}$ is the angle factor between a person and surface "n".

"If relatively small temperature differences exist between the surfaces of the enclosure the equation can be simplified to the following linear form:

$$MRT = T_1 F_{p-1} + T_2 F_{p-2} + \ldots + T_n F_{p-n}"$$

Figure 6:
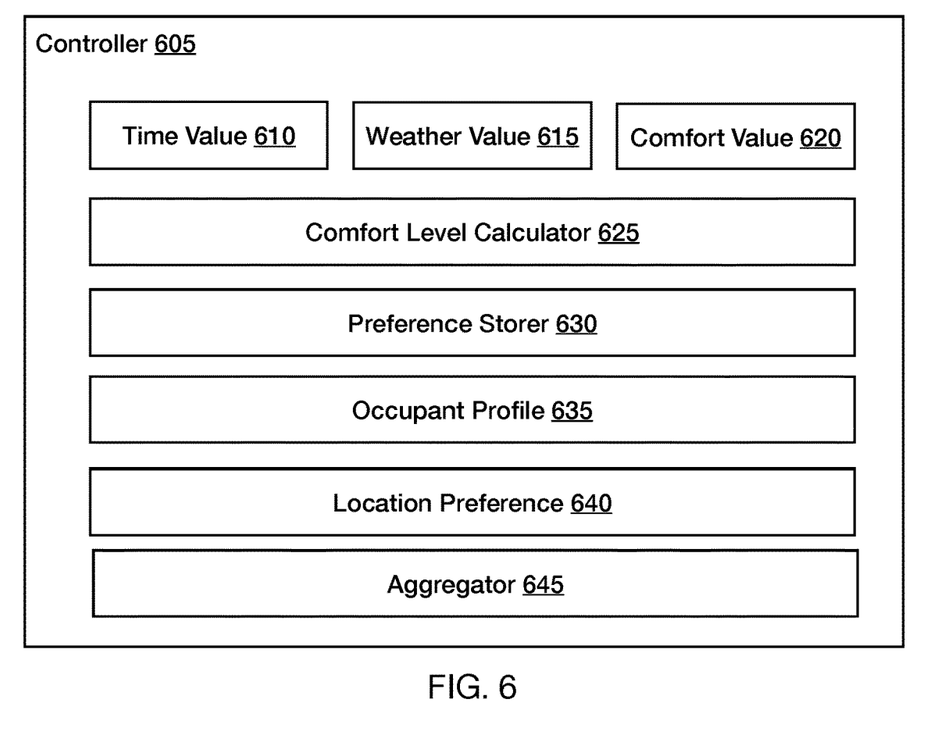
FIG. 6 is an exemplary functional block diagram showing controller aspects.

In some embodiments, a building control system, which may be a controller 110 with computer hardware 115 and memory 120 (which may be programmable memory), and which has the ability to store, run, and modify computer programs, resides in the defined space 105. This building control system may calculate the radiant temperature for an individual or several individuals, and use this calculation to change building state. With reference to FIG. 6, in some embodiments, the radiant value calculator uses at least one of a time value 610, a weather value, 615, and the preferences associated with the user (comfort value 620) to calculate a radiant temperature value. In some embodiments, preferences associated with a user include user metabolic rate 745. The user metabolic rate may be used by the building control system to modify at least one portion of the building state in at least one location, such as the location that the user is currently in.

In some embodiments, the building control system can notice when a signal associated with a user personal electronic device leaves the building, or an area around the building. When a signal goes missing, the building control system uses this information to modify the defined place state, by for example, no longer using the user's preferences to determine the defined place state.

Figure 3:
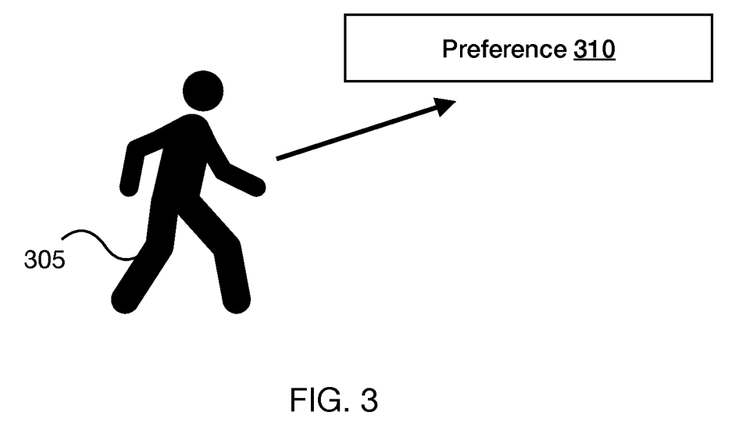
FIG. 3 is a diagram showing an exemplary embodiment of user preferences in conjunction with which described embodiments can be implemented.

With reference to FIG. 3, once a user 305 is known, a preference 310 associated with the user 305 can be determined. The preference 310 may be determined by using the user personal device signal to key into a database (e.g., the preference 135) stored in memory 120. The preference 310 may be a location value, temperature value, humidity value, lighting value, security value, entertainment value, personal services value, comfort value, grounds control value, etc., and as spoken of elsewhere. Once the preference is known, a modifier 140 may modify the space state depending on that preference. The preference may be a comfort value 620 or a portion of a comfort value 620. As the controller is able to controls resources in the defined space, once the controller understands what should be modified (e.g., lower the temperature, reduce allergens), the controller can turn on the appropriate resources (e.g., air conditioner, dampers, vents, air purifiers, etc.) to ensure that the temperature and allergen level are lowered, for example, in a given user's office. The modifier 140 may be associated with memory 120 in the controller 110, a program associated with computer hardware 115 and memory 120; and/or may be distributed between multiple controllers, etc.

Figure 4:
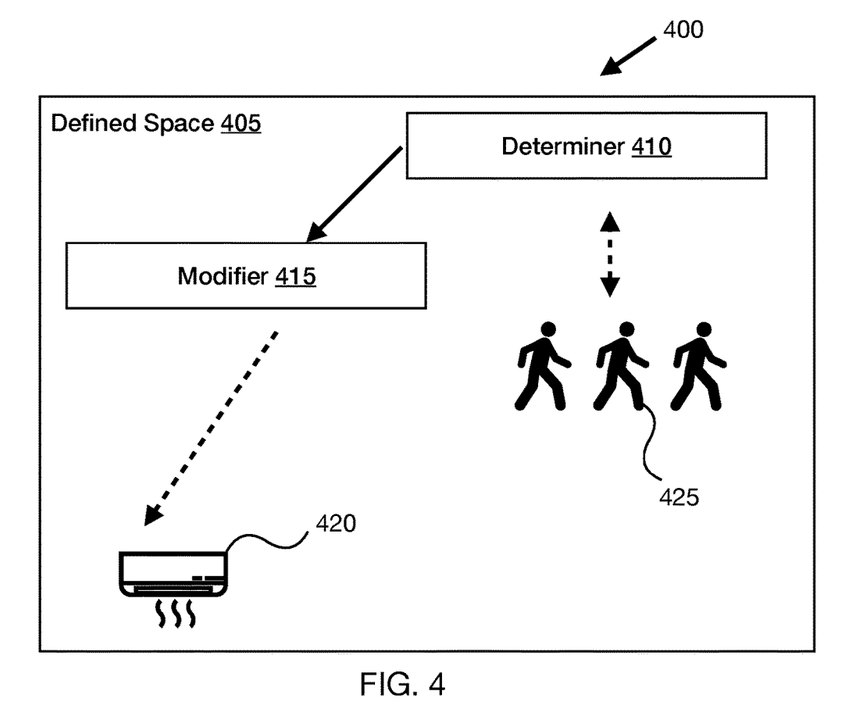
FIG. 4 is a diagram showing an exemplary flow diagram of a defined space using a determiner to change state which described embodiments can be implemented.

FIG. 4 at 400 shows an embodiment of a system described herein modifying the state of the defined space based on the number of people within the defined space 405. A determiner 410 may be operationally able to determine the number of people 425 in the defined space. This determination may be based on the number of noticed signals from a sensor (e.g., 125) that can determine location based on personal electronic devices in the area, such as with bluetooth signals, or other ways, as discussed with reference to FIG. 2. The sensor may also be able to notice the people directly, such as with a passive infrared sensor, an imaging IR sensor, etc.

The determiner 410 may update a value that indicates number of people in the space, or may use a different method to indicate number of people in the space. In some embodiments, the controller comprises the ability to modify devices that can be controlled by the controller. These devices may be wired to the controller, such as, e.g., an air conditioner 420, may be connected to the controller through wireless means, such as some sensors, or may be connected to the controller using a different method. In an embodiment, when the determiner determines that the number of people 425 within a defined space 405 has changed, the determiner signals a modifier 415, which uses the controller 110 to modify a device that controls state within the defined space 405, such as an air conditioner 420. Without limitation, any number of devices that can be controlled may be modified; e.g., heaters, water heaters, humidifiers, air filters, and a host of other devices.

Figure 5:
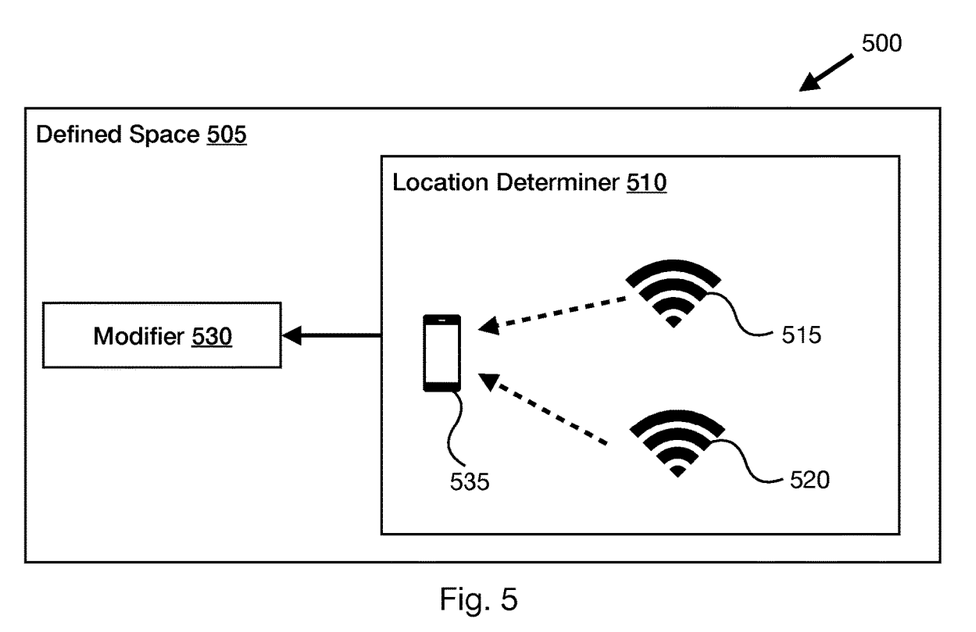
FIG. 5 is an exemplary diagram showing location determination aspects.

With reference to FIG. 5 at 500, the modifier 415, 530 is described in greater detail. A location determiner 510 may locate people or items in the defined space 505 depending on two or more beacons 515, 520 that are picked up by a personal electronic device 535, may determine location of people based on cameras, range finders, RFID badges, or infrared or ultrasound badges, or another method. This information is transferred to the modifier using a wired or wireless network, or some other method. The modifier 530 may be a computer program stored in memory 120, and may also comprise the ability to control state change devices controlled by the controller 110. When the modifier knows how many people are in the defined space, the modifier may modify at least a portion of the defined space 505 state (by controlling state-changing resources, such as air conditioners, heaters, humidifiers, air purifiers, etc.) based on the number of people in the defined space. At a minimum, each person gives off a certain amount of heat (~350,000 J of energy per hour). In several embodiments, the system can then determine how to adjust the resources within the defined space to account for the extra heat. This may involve the controller turning up an air conditioner 420 before the extra heat from the people is recorded on temperature thermometers, for example. Similarly, the controller could turn a heater down, anticipating the extra heat generated by the people within the defined space, or a portion thereof. This determiner 145 and modifier 140 may be, e.g., programs or portions of programs that runs on the controller or multiple controllers. In such cases, modifying the space state comprises modifying the output of devices associated with the state to keep space state at the same value it was previously.

With continuing reference to FIG. 5, a location determiner 510 may be included that uses a signal from a personal electronic device 535 within a defined space 505 to determine a person's location. The location determiner 510, in some instances, noticed signal strength and directionality to determine a location of the personal electronic device within the defined space 505. In other instances, the location determiner 510 comprises a bluetooth beacon that broadcasts a signal which contains e.g., a universally unique identifier that can be used to determine the phone's location. In some embodiments, an indoor positioning system is used which allows Bluetooth beacons to pinpoint a personal electronic device within a defined space 505.

In some embodiments, at least two, and possibly three bluetooth beacons 515, 520 are used by the location determiner 510 to determine the location of the personal electronic device 535. The beacons may be transmitting their namespace and an instance ID, a universally unique identifier (UUID), major and minor values, or, a different method of determining the beacon address and location. No matter the specific protocol, the beacons should be transmitting values that can be turned into location coordinates. Using the Received Signal Strength Indicator (RSSI) from the beacons, the device may be able to determine their position within a certain error. When three beacons are used, the personal electronic device should be able to be pinpointed with a fair amount of accuracy. That location can then be transmitted to the controller, or the controller may determine the location.

The location determiner 510 is, e.g., a program that runs on the controller. Once the location of the device is known, then a modifier 140, 530 can be used to change the state of the defined space within some distance of the personal electronic device 535. This location determiner may be, e.g., programs or portions of programs that uses sensor data and runs on the controller 110 or multiple controllers. In some embodiments, the sensor may process some of the sensor data prior to passing it onto the controller 110. In some embodiments, at least one signal associated with a personal electronic device is saved; e.g., in the memory 120, and the location determiner can determine that the stored signal has disappeared. In such cases, the modifier 530 may signal to the controller 110 to change state reflecting the updated number of people 425 in the defined space 105 or portion of the space.

III. Comfort Levels that May be Used with Embodiments Described Herein

A comfort level calculator 155, 625 may be used to calculate a comfort value 620. With reference to FIG. 6, a controller 605 is disclosed. This controller may be a single controller with hardware 115, and software stored in memory 120, or may be multiple controllers running as a distributed system. At 635, an occupant profile is disclosed. This occupant profile may comprise one or more preferences associated with a given user. The preference 135 associated with the user comprises a location value, (such as the location of the person's office), a preferred temperature value, humidity value, lighting value, security value, entertainment value, personal services value, comfort value, a grounds control value, some combination of the above, or a different sort of value, as shown with reference to FIG. 7.

The preference may also comprise, e.g., height, weight, sex, activity level, or insulation value of clothing. The user may enter those preferences into a computer program, with the preferences then stored in memory. The computer program may be an app that runs on a personal electronic device.

With further reference to FIG. 6, At 625, a comfort level calculator is shown, which, in certain embodiments, is operationally able to calculate a near-optimal (or a value more optimal than the current one) comfort level for a designated space using any of the methods and systems disclosed herein. Once the comfort value is known, the modifier 140 is operationally able to adjust the defined space state to match the comfort value. In an embodiment, a building control system, which comprises at least one controller 605, further comprises time values 610. These time values may be the time of day, such as 7:00 am, may be a period of time, such as from 7 am to 7 pm, may be a time curve, or may be a different sort of time value. Weather values 615 may also be used in the comfort level calculations. These weather values may be temperature, humidity, dew point, etc. In some embodiments, the comfort level calculator may use a time value 610, and a weather value 615. Other values that may be included to calculate a comfort value comprise current air speed, humidity, noise level, lighting level, entertainment noise level, or the preferences 135 associated with the user 305.

Figure 7:
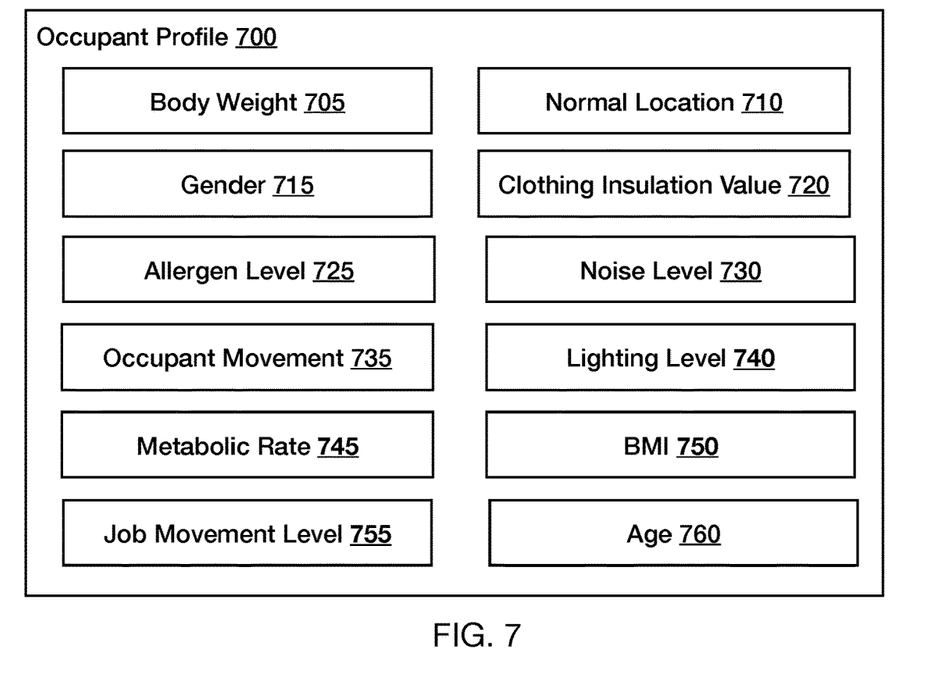
FIG. 7 is an exemplary functional block diagram showing comfort level aspects.

This comfort value 620 may be used to modify output of a device associated with the defined space that can be instructed to change state to meet the comfort value 620. With continuing reference to FIG. 3, a user 305 may have a preference 310 stored in memory 120. A defined space itself may have a preference, as well. This may be based on, e.g., requirements of non-human elements in the room, such as musical instruments, munitions, building requirements (such as pipes that might freeze, or certain types of equipment used in e.g., labs, manufacturing sites, etc. The defined space may be controlled based upon the comfort level. Controlling an area may comprise as simple an action as moving a fan to a specific area and turning it on. It may comprise opening or closing a vent, or may comprise a controller with a computer system turning on and off a variety of resources. A user preference 310 may come from an occupant profile 700. The occupant profile may contain information specific to the occupant, such as body weight 705, gender 715, and/or age 760, humidity requirements (e.g., useful for everyone, but also useful for non-human occupants), possible heat range (useful for everyone, but also non-human occupants) among other elements. In one embodiment, this profile information is stored in an occupant profile 635.

The occupant profile 635 contains potentially dynamic information about the current state of the occupant, such as information about current activity levels. The occupant profile 635 may also be related to a non-human item, such as a piece of furniture, munitions, or a musical instrument that requires specific humidity and temperature requirements to prevent degradation. In some embodiments, there may be non-human occupant profiles and human occupant profiles.

Additionally, in an embodiment, an occupant profile 635/ preference state information may include active or passive occupant feedback on current comfort. In one embodiment, this state information is gathered through a user interface using a mobile, wearable, handheld, and/or other electronic device. The preference/occupant profile creation may involve aggregation of profile and state information relating to the comfort states of occupants (human and non-human) into a suitable data structure—the occupant user interface. In some embodiments, a user may be able to modify occupant profile information, which may be used in an occupant user interface, a comport level calculator, an occupant controller, or in multiple of them, such that when a user, e.g., enter a defined space, they may be able to specify what they are wearing, what their activity level is, or, e.g., other information they may find useful to specify their comfort level. The user may be able to enter this information prior to entering the defined space, but it may be read once the defined space is entered. This information may be entered using an app stored on a personal information device such as a phone. This occupant profile, in certain embodiments, is used in the comfort level calculator 625 to determine a comfort level.

A location preference 640 is disclosed, which comprises, in some embodiments, information about a specific location, such as the defined space 105. This information may include temperature value, humidity value, lighting value, security value, entertainment value, personal services value, comfort value, or a grounds control value. The location preference may be stored in memory 120, and may be set up by a user 305, along with other preferences 310.

In some embodiments an aggregator 645 is operationally able to use the location preference and the occupant profile to modify the state of the defined space. The aggregator is able, in some embodiments, to aggregate preferences of two or more users to a single state value that can be used to set the state for the defined space. The aggregator may use a mean, a medium, a mode to determine the aggregate state, may use a weighted average that weights certain users over others, may use parameters that require the state to fall between certain values, or not fall below or above certain values, may use a combination of these, or may use another method to determine the estimate.

With reference to FIG. 7, in certain embodiments, the occupant profile 700 provides a user abstraction of one or more variables such as metabolic rate 745, body weight 705, body mass-index 750, gender 715, job movement level 755, ethnicity, normal location 710, current location, clothing insulation value 720, allergen level preferred 725, noise level preferred 730, lighting level preferred 740, current occupant movement 735, metabolic rate 745, BMI 750, job movement level 755. age 760, and so on. The noise level 730 may be associated with noise that HVAC or other equipment makes, as well as external factors, normal location (such as a user's office, or the room a muscle instrument is stored in). An electronic sensing device may be used that may comprise at least one sensor that measures occupant movement, motion, and/or other activity. The sensor or sensors of the above mentioned electronic device, wherein the said movement, motion, and/or other activity is gathered, provide sensor data that may be used to calculate, for example, the metabolic rate, which can be further used in an occupant comfort measure. In addition to the occupant state, current environmental variables such as temperature, wind speed, humidity, noise level, air flow noise level, entertainment noise level, lighting level, allergen level, etc., which together comprise the environmental variables, can be provided to the comfort model.

In one embodiment, environmental variables (e.g. ambient temperature, humidity, $CO_2$, VOC, allergen levels) are provided by sensing devices as described above. The comfort model accepts both the environmental variables and occupant state inputs (e.g., from the occupant profile 700) and determines the comfort level of the occupant(s), where the model comprises a mathematical equation of human comfort which outputs the comfort state of the occupant(s), such as, e.g., the mean radiant temperature, as discussed above.

The mathematical equation may comprise one or more of the variables like air temperature, radiant temperature, air velocity, humidity, metabolic rate, skin temperature, skin wetness, total evaporative heat loss from skin, skin surface area, sweat rate, body weight, body mass-index, gender, age, occupancy, ethnicity, locality, and/or clothing insulation value.

The mathematical equation of human comfort may be a derivative of, e.g., any of the following, and not to exclude any other models: Fanger Model, KSU Two-Node Model, Pierce Two-Node Model, Standard Effective Temperature Model, Adaptive Comfort Model, and/or any human comfort model.

In some instances, an occupant comfort mean function may be used. In such a case, an occupant comfort mean function aggregates the comfort states of all occupants. An occupant comfort mean function, is attained by any of the following techniques: averaging methods, such as arithmetic mean, geometric mean, harmonic mean, tri-mean, median, mode, mid-range, quadratic mean (RMS), cubic mean, generalized mean, weighted mean; machine learning and statistical techniques, such as linear regression, logistic regression, polynomial regression, k-means clustering, k-nearest neighbors, decision trees, perceptron, multi-layer perceptron, kernel methods, support vector machines, ensemble methods, boosting, bagging, naïve Bayes, expectation maximization, Gaussian mixture models, Gaussian processes, principal component analysis, singular value decomposition, reinforcement learning, Voronoi decomposition; and social theory voting techniques and concepts, such as social welfare functions, social choice functions, single transferrable vote, Bucklin's rule, social decision schemes, collective utility functions, and/or Condorcet method and extensions such as Copeland's rule, maximum, Dodgson's rule, Young's rule, and/or ranked pairs.

In some embodiments, the comfort model may also comprise comfort levels for non-human assets that allows for comfort models of equipment, building envelope components, animals, plants, collections, systems, and/or other items in/around/near a defined space. These may be used to provide more optimal management comprising the quality, comfort, value, or longevity of these assets. The comfort model for the non-human asset comprises, e.g., a mathematical equation of a defined space asset comfort, which might comprise a mathematical equation of building asset comfort which itself may comprise one or more of an equipment environmental operation model, a metallic rust model, a building material moisture capacity model, a building material mold potential model, an animal comfort model, a plant health model, and a water freeze model. These models and the math underlying them are known to those of skill in the art.

Figure 8:
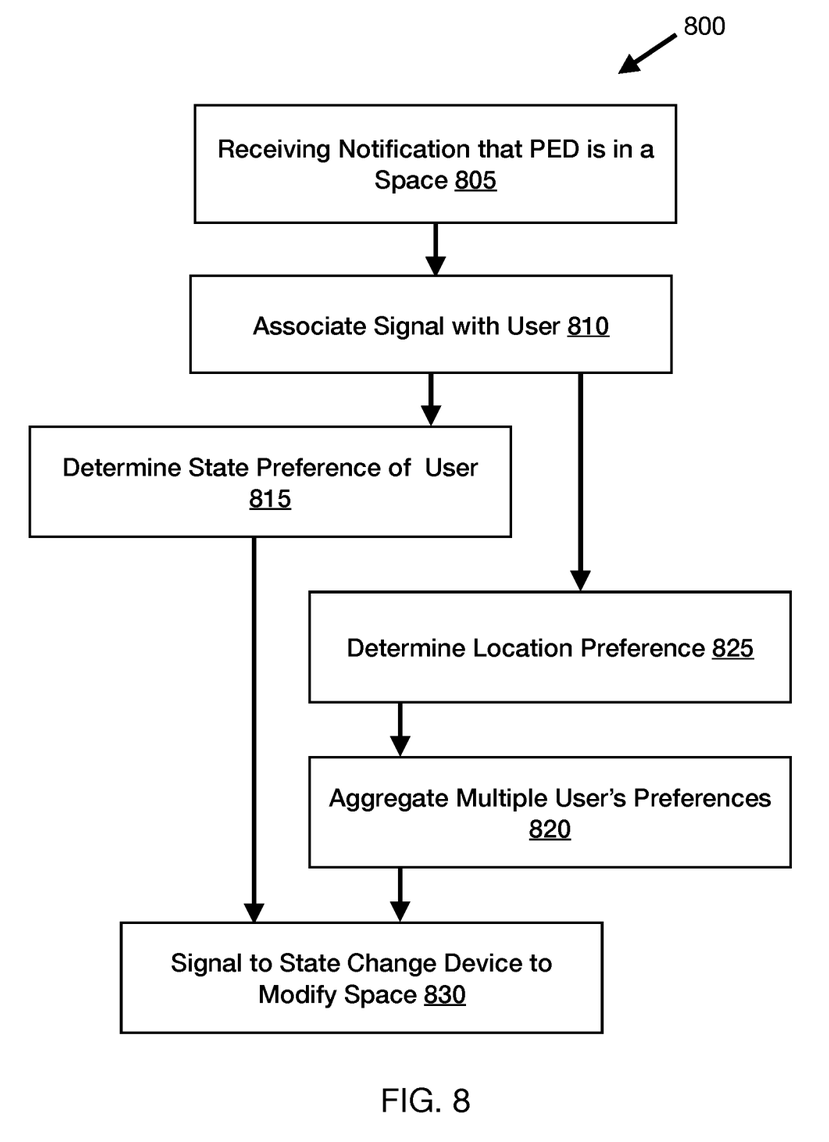
FIG. 8 is an exemplary flow chart illustrating steps in some methods that may use a personal device to access information to modify space state.

IV. Exemplary Method for Modifying Building State by Determining User Preference FIG. 8 illustrates an example method 800 for determining a user preference which may be used to modify a defined space state. A controller 110 or other controlling mechanism receives notification that a personal electronic device (PED) has been detected in a monitored space 805. FIG. 2, e.g., and text associated with it describes embodiments which may be used to do so. A signal from the personal electronic device is then associated with a user 810. FIGS. 3 through 5 and text associated with them describe embodiments which may be used to associated the signal with the user. Additionally, other methods known to those in the art may also be used.

Once the signal has been associate with a user, a state preference of the user may be determined 815. This state preference may be looked up a database associated with the signal, the user, or using some other method. The user may be able to change their state preference on the fly once reaching the defined space. The state preference may be fed into a comfort model which uses other information associated with the space (such as with a comfort level calculator 625) to determine optimal (or near-optimal) state of the building or section of the building (such as a room the user may be in). State preference of the user may also need to be modified to more accurately match the user's desired state. For example, if a user prefers the temperature to be 72°, but the humidity level is 65%, the actual temperature may be lower for the user to feel like the temperature is 72°.

In some embodiments, locations have preferences for state. For example, a room with an antique piano may require humidity to be within a certain range at all times. At 825, location preference(s) for a specific location or locations are determined.

In some embodiments, the user's information may be combined with other users in the building or near the user or in the same space, etc., to achieve a comfort level. For example, different users may have differing comfort level preferences; some people like it hot, and some don't. At 820, multiple user's preferences may be aggregated to generate a single state that the defined space can be set to. For example, user preferences may be averaged, the mode may be taken, a weighted average may be used, with certain values, users, etc., being given higher weights, certain values may have predefined minimums and/or maximums, and so forth. Once a comfort level is determined, this comfort level may then be used by a controller 110 that controls state change devices in the space to signal to a state change device or devices to change state of the defined space 830.

V. Computing Environment

Figure 9:
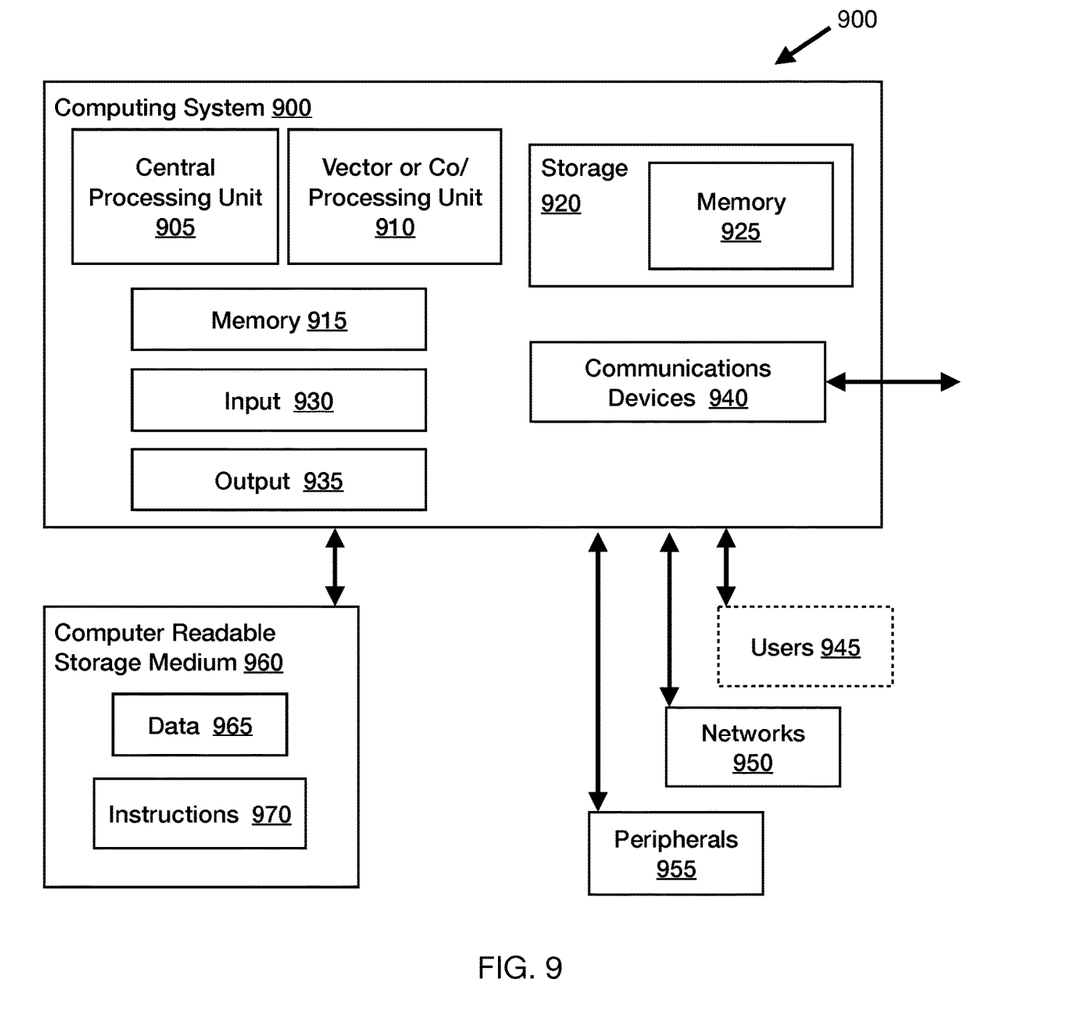
FIG. 9 is a block diagram of an exemplary computing environment in conjunction with which described embodiments can be implemented.

With reference to FIG. 9, the computing environment (which may be a controller or a controller system) includes at least one central processing unit 905 and memory 915, 925. The processing unit executes computer-executable instructions and may be a real or a virtual processor. There might also be a vector or co/processing unit 910 that enables fast vector processing. In a multi-processing system, multiple processing units execute computer-executable instructions to increase processing power. The memory 915, 925 may be volatile memory (e.g., registers, cache, RAM), non-volatile memory (e.g., ROM, EEPROM, flash memory, etc.), or some combination of the two. For example, the memory can be volatile memory, e.g., static memory cells, as in FPGAs and some CPLDs; or non-volatile memory, e.g., FLASH memory, as in some CPLDs, or in any other appropriate type of memory cell. The memory stores software implementing described techniques and tools. The computer system may be distributed, with multiple processors and associated memory in different locations that communicate using wired or wireless network connections. These distributed computing nodes may run simultaneously run the same program using distributed computing techniques.

A computing environment may have additional features. For example, the computing environment may include storage 920 which may also include memory 925, one or more input devices 930, one or more output devices 935, and one or more other communication devices 940. These may include touch screens, keyboards, game controllers, touchpads, LED screens, voice-operated input systems, printers, phone connections, FAX machines, etc. An interconnection mechanism such as a bus, controller, or network interconnects the components of the computing environment. Typically, operating system software stored in memory 915, 925 provides an operating environment for other software executing in the computing environment, and coordinates activities of the components of the computing environment. The computer system 900 can connect to other computer systems through network(s) 950, which may be wired, wireless, or both. Peripherals 955, such as external hard drives, modems, mice, keyboards, zip drives, scanners, 3-d printers, etc. Certain things may belong to more than one category.

The computing system 900, like other suitable systems, also includes one or more computer-readable storage media 960. Media 960 may be of different physical types. The media 960 may be volatile memory, non-volatile memory, fixed in place media, removable media, magnetic media, optical media, solid-state media, and/or of other types of physical durable storage media (as opposed to merely a propagated signal). In particular, a configured medium 960 such as a portable (i.e., external) hard drive, CD, DVD, memory stick, or other removable non-volatile, non-transient memory medium may become functionally a technological part of the computer system when inserted or otherwise installed, making its content accessible for interaction with and use by central processing unit 905. The removable configured medium 960 is an example of a computer-readable storage medium 960. Some other examples of computer-readable storage media 960 include built-in RAM, ROM, hard disks, and other memory storage devices which are not readily removable by users 945. A computer-readable medium should not be considered a signal; neither should a computer-readable memory be considered a signal.

The medium 960 is configured with instructions 970 that are executable by a central processing unit 905; "executable" is used broadly to include, human readable source code, such as Java or C++, compiled code, and/or machine code. Executable code also includes code that a runs using a distributed system, such as a series of controllers and controllers that distribute and run complex problems. The medium 960 is also configured with data 965 which is created, modified, referenced, and/or otherwise used for technical effect by execution of the instructions 970. The instructions 970 and the data 965 configure the memory or other storage medium 960 in which they reside; when that memory or other computer readable storage medium is a functional part of a given computer system, the computer system may be configured by the instructions 970 and data 965.

Although an embodiment may be described as being implemented as software instructions executed by one or more processors in a computing device (e.g., general purpose computer, cell phone, or controller), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

I claim:

1. A building control system that modifies upon user preference comprising:
   a controller, the controller comprising computing hardware and memory;
   the controller operationally able to communicate with a sensor that is operationally able to notice at least one signal from a personal electronic device;
   a preference associated with a user stored in memory;
   an associator associated with the controller which has access to an association between the user and the personal electronic device associates the personal electronic device with a user, and
   determines the preference associated with the user;
   a comfort level calculator associated with the controller, wherein the building control system further comprises time values and weather values and wherein the comfort level calculator comprises using a time value, a weather value, current air speed, humidity, air flow noise level, lighting level, or the preference associated with the user to calculate a comfort value; and
   a modifier, using the controller, that instructs the building control system to modify state of a defined space based on the comfort value.

2. The building control system of claim 1, further comprising a determiner which is operationally able to determine number of people in a defined space at least partially controlled by the controller based on number of noticed signals from the sensor and wherein the modifier instructs the building control system to modify at least a portion of the state of the defined space based on the number of people in the defined space.

3. The building control system of claim 2, wherein a noticed signal comprises strength and directionality; further comprising a location determiner that uses the strength and directionality to determine a location of the personal electronic device within the defined space.

4. The building control system of claim 3, wherein the modifier instructs the building control system to control a portion of the defined space based on the location of the personal electronic device within the defined space.

5. The building control system of claim 4, further comprising at least two bluetooth beacons within the defined space and wherein the location determiner determines location using the at least two bluetooth beacons.

6. The building control system of claim 1, wherein the preference comprises change in temperature, humidity, lighting, security, grounds control, or entertainment.

7. The building control system of claim 1, wherein the comfort level calculator is operationally able to calculate number of people in the defined space, calculate the comfort value based on number of people in the defined space; and wherein the modifier instructs the building control system to adjust state of the defined space to match the comfort value.

8. The building control system of claim 1, further comprising a location determiner, wherein the memory stores at least one signal associated with at least one personal electronic device, and wherein the location determiner determines that the at least one signal stored by the building control system has disappeared.

9. The building control system of claim 1, wherein the preference associated with a user further comprises an occupant profile associated with the memory, wherein the occupant profile comprises a preference and wherein the preference comprises location value, temperature value, humidity value, lighting value, security value, entertainment value, personal services value, comfort value, grounds control value, height, weight, sex, activity level, or insulation value of clothing.

10. The building control system of claim 9, further comprising an estimator associated with the memory, which uses the preference associated with the user to estimate at least one of user metabolic rate, user heat level, user convection level, or user sweat level, to calculate a comfort value and wherein the controller uses the comfort value to modify the state of the defined space.

11. The building control system of claim 1, further comprising multiple users with multiple user preferences, and an aggregator associated with the controller, which calculates an aggregate state value comprising a calculation of the multiple user preferences and wherein the modifier uses the aggregate state value to modify output of a device operationally controlled by the controller to achieve the aggregate state value.

12. The building control system of claim 1, wherein the comfort level calculator is operationally able to create the comfort value based on user preferences of multiple people within the defined space.

13. The building control system of claim 12, wherein the controller uses the comfort value to modify output of a device operationally controlled by the controller to modify the state of the defined space.

14. The building control system of claim 1, wherein the building control system is operationally able to use a value associated with the sensor to update number of users in the defined space, and to modify output of devices associated with the defined space to account for heat given off by the number of users.

15. A state control method implemented with a controller with memory and a processor controlling a state change device, the processor coupled with instructions stored in the memory which, when executed by the processor, perform a method, comprising:
   the controller receiving a notification from a sensor that a personal electronic device is within a defined space;
   using information stored in the memory, the controller associating the notification with a user;
   the controller determining a state preference of the user, the state preference previously stored in the memory;
   a comfort level calculator associated with the controller using a time value, a weather value, current air speed, humidity, air flow noise level, lighting level, or the state preference of the user to calculate a comfort value; and
   the controller using the the comfort value to modify device state of the state change device to modify space state of the defined space.

16. The state control method of claim 15, further comprising an occupant profile stored in memory, and wherein the state preference of the user stored in memory is a portion of the occupant profile.

17. The state control method of claim 16, further comprising using information stored in the memory of the controller to determine a location preference, wherein the location preference comprises temperature value, humidity value, lighting value, security value, entertainment value, personal services value, comfort value, or a grounds control value.

18. The state control method of claim 17, further comprising using the information stored the memory of the controller to estimate multiple users state preferences and location preferences to determine an aggregated state value and wherein modifying the state change device comprises using the aggregated state value to modify the state change device to achieve aggregated state value in the defined space.

19. A non-transient storage medium configured with code which upon execution by a controller with memory, having one or more processors coupled with instructions stored in the memory controlling a state change device, which performs a state change method, the state change method comprising:
   a sensor noticing a signal from a personal electronic device within a defined space;
   receiving, by the controller, a notification from the sensor that the personal electronic device is within the defined space;
   using information stored in the memory, associating the signal from the personal electronic device with a user;
   determining a state preference of the user, the state preference previously stored in the memory;
   a comfort level calculator associated with the controller using a time value, a weather value, current air speed, humidity, air flow noise level, lighting level, or the state preference of the user to calculate a comfort value; and
   the controller using the comfort value to modify device state of the state change device; modification of the state change device operationally able to modify space state of a defined space.

* * * * *